(12) United States Patent
Browne et al.

(10) Patent No.: US 7,029,044 B2
(45) Date of Patent: Apr. 18, 2006

(54) TUNABLE, HEALABLE VEHICLE IMPACT DEVICES

(75) Inventors: Alan L. Browne, Grosse Pointe, MI (US); Nancy L. Johnson, Northville, MI (US); Mark A. Kramarczyk, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/716,371

(22) Filed: Nov. 18, 2003

(65) Prior Publication Data

US 2005/0104391 A1 May 19, 2005

(51) Int. Cl.
*B60R 21/04* (2006.01)
(52) U.S. Cl. ............... 293/137; 296/187.09; 267/175
(58) Field of Classification Search ............... 293/135, 293/136, 137; 296/187.03, 187.09; 267/139, 267/175, 176
See application file for complete search history.

(56) References Cited

U.S. PATENT DOCUMENTS

| | | | |
|---|---|---|---|
| 3,174,851 A | 3/1965 | Buehler | |
| 3,403,238 A | 9/1968 | Buehler et al. | |
| 3,788,626 A * | 1/1974 | Isaacson | 267/202 |
| 4,304,613 A | 12/1981 | Wang et al. | |
| 5,189,110 A * | 2/1993 | Ikematu et al. | 525/314 |
| 6,050,624 A * | 4/2000 | Kim | 293/132 |
| 6,530,564 B1 * | 3/2003 | Julien | 267/147 |
| 6,910,714 B1 * | 6/2005 | Browne et al. | 280/753 |

OTHER PUBLICATIONS

G. Kauffman & Isaac Mayo, The Metal with a Memory, Invention & Technology—Fall 1993, pp. 19-23.
Shape Memory Applications, Inc., Selected Properties of NiTi, Copyright 1999, pp. 1-2.
Memry Corporation, Nitinol Product Information, http://www.memry.com/products.htm, pp. 1-5.

* cited by examiner

*Primary Examiner*—Joseph D. Pape
(74) *Attorney, Agent, or Firm*—Kathryn A. Marra

(57) ABSTRACT

An impact absorbing device for a vehicle uses a shape memory material that can be heated to repair deformation from a relatively low speed, low energy impact and its stroking force and energy absorption can be tuned by heating. The shape memory material is suitably used in a crash box having an inserted impact absorbing ram, the box being placed, for example, between a bumper and strong body member. The shape memory material is attached to the box and ram for absorbing energy as the ram is driven into the box. Electric resistance heating may be used to repair or tune the shape memory material.

16 Claims, 2 Drawing Sheets

TUNABLE, HEALABLE VEHICLE IMPACT DEVICES

TECHNICAL FIELD

This invention pertains to impact energy absorption systems for automotive vehicle bodies. More specifically, this invention pertains to such systems containing structures having impact absorbing capabilities that can be adjusted (tuned) to match the differing energy absorbing needs in different impact scenarios and restored (healed) after relatively low speed/energy impacts. The energy absorbing medium is an "active" material with shape memory and energy absorbing properties that can be altered by a microstructural phase transition induced by a temperature change.

BACKGROUND OF THE INVENTION

Designers of automotive vehicle bodies seek structures that will enable the body to absorb low speed impacts with low repair costs while still absorbing much energy from higher speed impacts. For some vehicle applications it has been suggested to use a "crash box." Crash box is the name applied to dedicated energy management units that are mounted between, and interconnect, the bumpers and longitudinal rails of a vehicle. Conceptually and theoretically, an ideal crash box is an inexpensive, low mass, easily replaceable unit that isolates and protects the rest of the vehicle structure from damage in crashes at velocities up to, e.g., 15 km/h. by deforming elastically (reversibly) at impact speeds below 8 km/h, and by deforming irreversibly (crushing) at force levels that are sufficiently high to dissipate the total impact energy at impact speeds between 8 and 15 km/h. Thus, crash boxes are intended to have minimal repair costs in crashes below 8 km/h, and, because they are easily replaceable "sacrificial" elements, to reduce vehicle repair costs in crashes between 8 and 15 km/h.

Since impact damage is to be confined to the crash boxes in impacts between 8 and 15 km/h, they are designed to crush at a lower force level than the rest of the vehicle body structure. However, this lower crush force level means that they are less efficient as energy absorbers in crashes above 15 km/h, i.e. that they dissipate less energy per unit length crushed than the body rails to which they are attached. For a vehicle of fixed length, from this standpoint of crushing at a lower force level and dissipating less energy per unit length than the rails to which they are attached, crash boxes are a less than optimum use of crush space. Thus, in addition to having a crash box that is easily repaired following a low speed impact, it would be desirable to have such a box that could be adjusted (tuned) to absorb a higher level of energy in a higher speed impact if, for example, a crash warning system on the vehicle sensed such an impending impact.

It can be visualized that repairable and tunable crash boxes could be based on either hydraulic or magnetorheological fluids (MRF). In such a unit, axial loading in a crash would cause a piston to stroke in a cylinder and dissipate energy either by forcing a viscous fluid through an orifice or shearing a fluid in the gap between piston and cylinder wall. A perceived advantage of such units is that they could, at least theoretically, have their crush forces adjusted/optimized to match the severity of each specific crash event based on sensor input as to the severity of the crash event. The adjustment could be through a rapid change of orifice size, or through a rapid change in the strength of the applied magnetic field in the case of an MRF. Another positive feature of such units is that the piston could be returned to its impact receiving position by a return force or mechanism such as a spring, so that the units would be fully restorable after a low speed crash. Thus such units could be both tunable and healable, at least for low speed crashes. However, such hydraulic and MRF units are quite heavy in practice and after having bottomed out in absorbing energy during an impact they are basically rigid units that resist any further crushing and in this way reduce the crush efficiency of the vehicle front end.

It is an object of this invention to provide a relatively simple and very adaptable design for tunable and repairable energy absorbing devices for an automotive vehicle based on the use of active materials as the energy absorbing element.

SUMMARY OF THE INVENTION

This invention makes use of shape memory materials of the type that can be prepared in a variety of useful configurations for efficient absorption of the energy of an impact on a vehicle body. The shape memory material is used in the form of one or more bodies such as wire springs, rolled sheets, wire meshes, foams or collapsible tubes that undergo a predictable plastic deformation when absorbing impact energy up to a design level. At some time following the impact, the deformed body self-restores to its original shape as it is variously heated or cooled above or below a known transformation temperature at which the transformed microstructure of the material reverts to its original shape.

Certain polymeric materials (termed shape memory polymers, SMP) and certain crystalline metal alloys (termed shape memory alloys, SMA) have shape memory characteristics suitable for use in the practice of this invention. As will become apparent SMA materials and SMP materials may be used individually or in hybrid combinations in the practice of the invention. An example of a suitable shape memory material is the family of metal alloys that contain nearly equal atomic proportions of nickel and titanium (NiTi). They are described in patent literature and the product technical information publications of the commercial entities that supply them. Depending upon their exact composition, including in some cases small amounts of other elements, these NiTi alloys undergo a transformation from a martensite crystal structure to an austenite form when heated above temperatures ranging from about −200° C. to 110° C. Bodies of specific compositions can be prepared to transform at a temperature in the range that is suitable for an intended application.

The body is shaped of the alloy material when the alloy is in its austenite form and then cooled to its martensite form. A NiTi alloy spring for use in a vehicle impact absorbing application might be formulated to have a martensite to austenite transformation temperature of, for example, 60° C. or higher. The spring in its impact absorbing shape would be produced at a temperature above 60° C. and cooled to ambient for assembly in a crash absorbing device. The microstructure of the cooled spring changes to its martensite crystal phase with minimal change in shape. The spring or springs used in the device would be designed to absorb an impact of a representative vehicle sized mass at a speed of, e.g., up to 8 km/h with a fixed object such as a post and be restored to its original shape. For very low energy impacts the deformation of the springs might be totally elastic and they would return to their original shape when the vehicle is backed from the post. But most such impacts will permanently deform the martensitic springs. However, when they are later heated above 60° C. they transform to their austenite crystal phase and return to their original shape as springs, and the device is "healed." The springs or other impact absorbing forms of NiTi type shape memory materials can be healed from repeated strains of the SMA of up to about 4% and in some instances up to 8%. And so the springs, tubes or rolled sheets, etc., must be sized and organized in the crash box, or the like, to be healable in such low speed impacts.

The use of a shape memory material with properties like the NiTi alloys also provides a way of "tuning" the properties of a crash device in which they are used. The NiTi springs are usually stronger in their austenite phase than in their martensite form. Their stiffness and yield strength, depending upon composition and microstructure, can be as much as three times greater in the austenite form above, e.g., 60° C. If the vehicle has a crash level sensing capability based on, for example, radar or an accelerometer/microprocessor system, or even the current velocity of the vehicle, the martensitic NiTi springs can be quickly heated to their austenite form and, therefore, will crush at a higher force level and, thus, have a larger energy absorbing capacity. Accordingly, in this example, the shape memory alloy springs are tuned to increase their energy absorbing capacity by heating. Of course, the devices can be formed with different shapes and have different strengths at the same tuning temperature.

A tunable, healable crash impact energy absorbing device for a vehicle using shape memory materials may, of course, take many different forms. However, in a preferred embodiment the shape memory materials are used in a crash box between an impact member on the vehicle, such as a front bumper, and a strong body member such as a longitudinal body rail. For example, the crash box has a longitudinal axis in the direction of anticipated impact. One end of a ram is inserted part way in an inlet at the front of the crash box. The other end of the ram bears against a bumper or other impact receiving surface. One end of a shape memory material body of this invention is secured to the box and the other to the inserted end of the ram. When an impact to the vehicle body tends to drive the ram into the box the shape memory material is strained and deformed to absorb impact energy.

As suggested, the shape memory material can be used, for example, in the form of springs that can be compressed or expanded, sheet material for stretching, or helical rolling or unrolling, collapsible tubes, wire mesh or foam. Wire mesh or foam can take virtually any shape to occupy an impact absorbing space. Tubes can be clustered in a group, employed as nested concentric tubes, of equal or different lengths, or employed in telescoping cold forming arrangements. These are just examples of many forms in which shape memory material can be used in the practice of this invention.

Heating is used to heal or tune the shape memory material. When metal alloys are used they can often be heated very quickly by passing an electrical current through the electrically conducting, resistive material. Suitable electrical connections are made to the metal impact absorbers in the crash box and a suitable microprocessor or other controller used to initiate and time the flow of the heating current. For electrically non-conductive shape memory materials, separate radiant heaters can be employed or wires embedded for resistance heating.

Thus an effective impact absorbing device is provided for a vehicle body. Since the device uses active materials as described, it can be repaired at low cost after low energy impacts and tuned to provide more substantial energy absorption capacity for higher energy impacts. These and other objects and advantages of the invention will become more apparent for a detailed description of preferred embodiments which follows.

DESCRIPTION OF PREFERRED EMBODIMENTS

The practice of the invention will be illustrated in connection with the construction of a crash box which is mounted to a longitudinal rail of an automotive vehicle body and contains a partially inserted ram that is attached to the back of a bumper beam.

Present automobiles have a bumper system that often includes an outer layer of decorative fascia material which is shaped and painted to complement the design of the front end of the vehicle. The fascia covers a bumper bar which spans the front of the vehicle and is formed of a suitable polymeric material or preferably steel or aluminum. The bar is often attached to a rail body frame structure of the body by means of a hydraulic shock absorber device. But in accordance with this invention, the bumper bar is attached to the vehicle body by means of an interposed crash bar as will be described.

Figure 1:
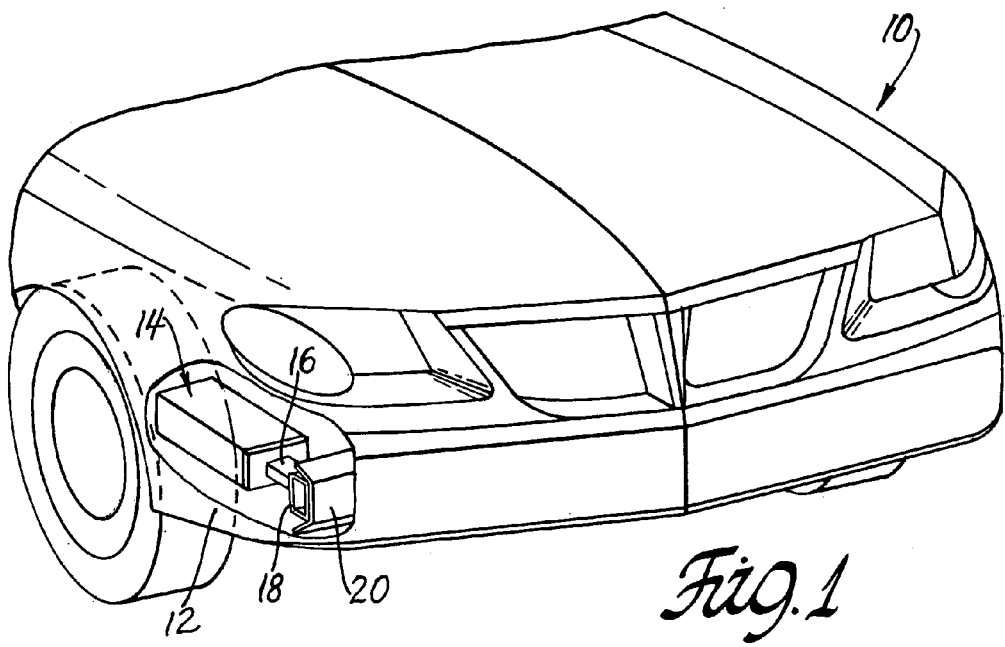
FIG. 1 is an oblique view of the front of a car showing in phantom outline the location of a crash box containing shape memory material and located behind the front bumper fascia and bumper beam.
Figure 2:
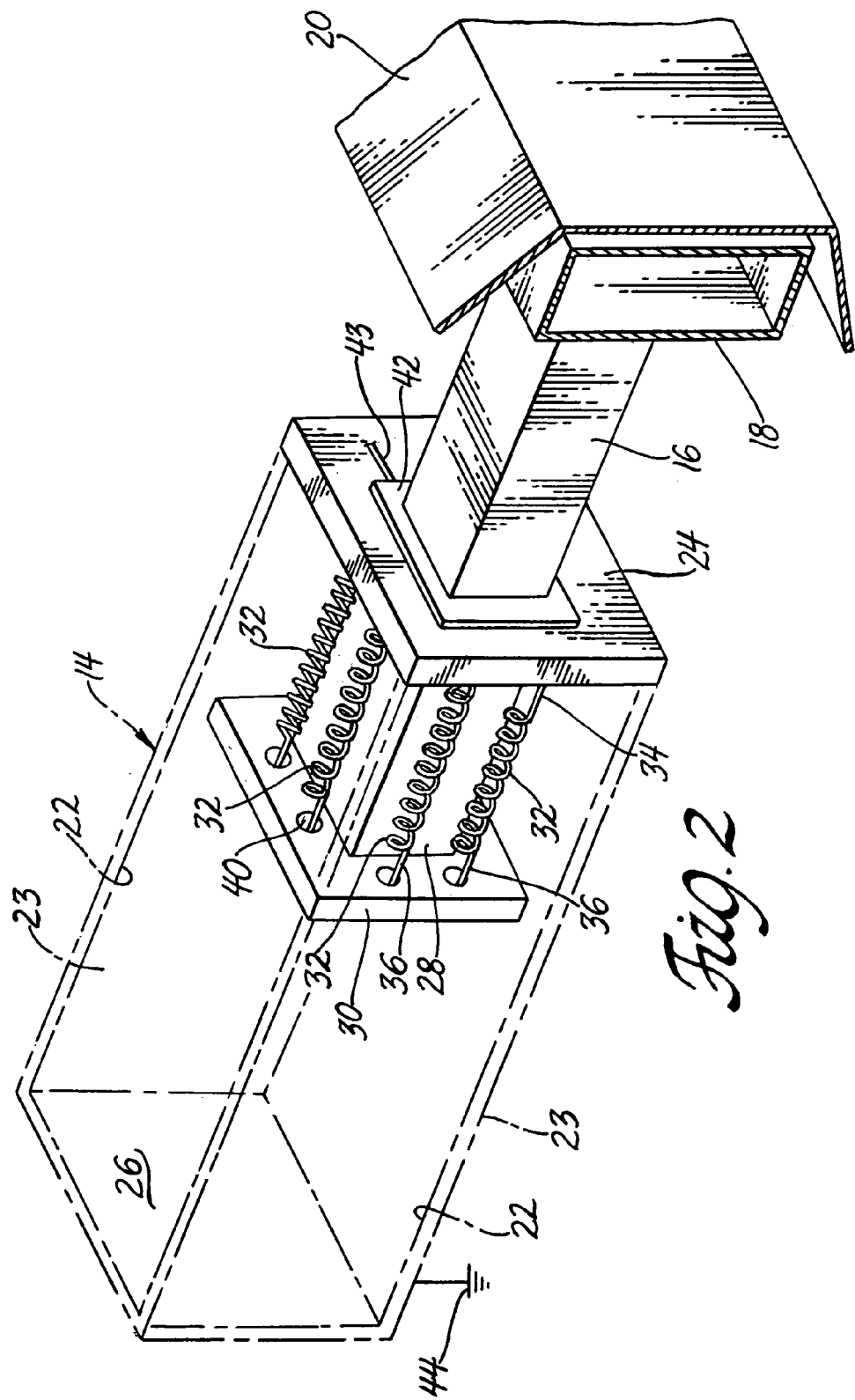
FIG. 2 is an isometric view of a crash box using shape memory NiTi alloy springs.

In FIG. 1 of the drawings, a view of the front external surfaces 10 of a representative car is shown. The familiar outline of the vehicle hood, front light assemblies, radiator grill, bumper fascia and front wheel are apparent. The view contains a broken away outline 12 within which is seen a representative crash box 14 with a forward extending tubular ram 16 that is attached to one side of a tubular vehicle bumper bar 18 (shown fragmentally and schematically). A like crash box would typically be used on the other side of the vehicle. The bumper beam fragment 18 is covered with a fascia piece 20, also shown schematically. The rear end of the crash box 14 is suitably fixed to the front end of a body side rail, not shown, or other suitable body structure member. The crash box acts like an extension of the body frame reaching to the bumper bar 18. FIG. 2 shows the crash box 14 in isolation and in more detail. It is shown in phantom outline for easier illustration of SMA energy absorbing contents. Ram 16 is illustrated as rectangular in cross section but it may be a round tube or of other desired shape.

Crash box 14 suitably has a shoebox shape. It is illustrated with a rectangular cross-section but like ram 16, the crash box can be a round tube or of other desired shape. Crash box 14 has opposing vertical sides 22, opposing horizontal sides (top and bottom) 23 and a front end 24 and a rear end 26. As stated, rear end 26 is suitably attached to a longitudinal frame rail of the vehicle, not shown. The front end 24 of the crash box 14 has an opening, rectangular in this embodiment, through which a portion of the length of ram 16 is inserted. Front end 24 is made to support ram 16 and permit it to slide through the opening as will be described. The inserted end 28 of ram 16 is connected to a rectangular base plate 30 which also supports ram 14 and serves as a slide member fitting the inside profile of crash box 14. The sides of rectangular base plate slide rearwardly on the inside surfaces of the vertical sides 22 and the horizontal sides 23 of crash box 14 if ram 16 receives an impact that drives it further into crash box 14.

As shown in FIG. 2, wire coil springs 32, (one or more springs on each side of ram 16, with two springs on each side shown) of nickel-titanium shape memory material are employed as impact absorbing members. The front end 34 of each spring 32 is mechanically attached by any suitable connector (not visible in FIG. 2) to the front 24 of crash box 14. The rear end 36 of each spring 32 is mechanically attached to base plate 30 by a suitable mechanical connector 40. The connector for the front end of spring 32 is suitably like mechanical connector 40. Thus, any impact on ram member 16 tending to drive it further into crash box 14 is resisted by coil springs 32.

The ram 16 and the length of each coil spring 32 have initial positions before any impact upon bumper beam 18. Two such crash boxes may be used on a vehicle, one at each end of a front bumper. Upon impact, the ram 16 is driven into crash box 14 stretching springs 32. The size(s), spring constant(s) and number of springs are specified to provide the intended energy absorption function of crash box 14. For example, for a frontal center impact of a 1400 kg vehicle against a post at a vehicle velocity up to 8 km/h, the crash system may be designed to stretch the springs elastically. The stretched springs 32 would then self-return the ram 16 to its initial position as the bumper is backed from the post.

For higher energy impacts on ram 16, arising from velocities up to, e.g., 15 km/h, the springs 32 would be strained beyond their elastic limit. In this situation, the springs 32 would be heated at a suitable time after the impact to transform them to their austenitic form in which they self-return the ram 16 to its initial position. As will also be described, the springs may be designed for tuning to receive even higher energy impacts.

Springs 32 which are suitably made of a nickel titanium alloy are initially formed as coil springs when the alloy is in its austenite form. The springs are then cooled to ambient temperature. During the cooling, they transform to their martensite form. And this is the form in which springs 32 are assembled into crash box 14 and await an impact.

Again referring to FIG. 2, connections for electric resistance heating are made to springs 32. Rectangular conductive strip 42 is fixed to the box front end 24 around ram 16. A suitable electrical connection, such as lead wire 43, from the vehicle battery or other power source, not shown, is made to conductive strip 42. Suitable conductive leads, not shown, conduct current from strip 42 through box front end 24 to the front ends 34 of springs 32. Rear ends 36 of springs are electrically grounded through crash box 14 to the vehicle body as indicated at 44.

When a low energy impact has strained the SMA wires that form the springs beyond their elastic limit (e.g., up to 8% strain), they are repaired, either by action of vehicle systems or at a repair location. In either case, an electrical current source is applied to strip 42 to heat springs 32 to a temperature in the austenite region of their microstructure. This heating causes springs 32 to undergo a microstructural phase transformation and return to their original shape. In so doing they withdraw ram 16 to its original position prior to any impact. The assistance of a repair person may be used in repairing the crash box system.

The springs in the crash box are intended to operate as just described under low energy impacts up to 8–15 kilometers per hour. In the event of a higher energy impact this device will not operate to absorb a substantial portion of the energy of such a greater impact. Many vehicles today have crash-sensing devices such as radar systems or accelerometers that are located at the front of the vehicle, and work as a part of a computer managed crash detection system. Such crash detection systems rapidly (within a fraction of a second) sense the onset of a substantial impact. When such an impact detection system detects an impending high speed impact, the system can immediately command on-vehicle electrical resistance heating of springs 38. While sophisticated radar or accelerometer crash detection systems may be used as a basis for tuning the SMA energy absorbing elements, the current velocity of the vehicle can be used as a basis for such tuning when an accelerometer/microprocessor system first recognizes a crash.

Electrically conductive springs 32 are rapidly heated to a temperature in their austenite region in which they are stronger and deliver a high force during deformation. Selective heating of some or all of the SMA elements can be used to change to different degrees the energy absorbing properties of an assembly of the elements. When thus tuned to their austenite form, springs 32 can store and eventually dissipate at high elongation more of the energy of the larger impact. In this situation, the springs can be deformed beyond repair and, if stroking is extensive enough, the body of the crash box itself could be crushed in absorbing the energy of such a more substantial impact.

Figure 3:
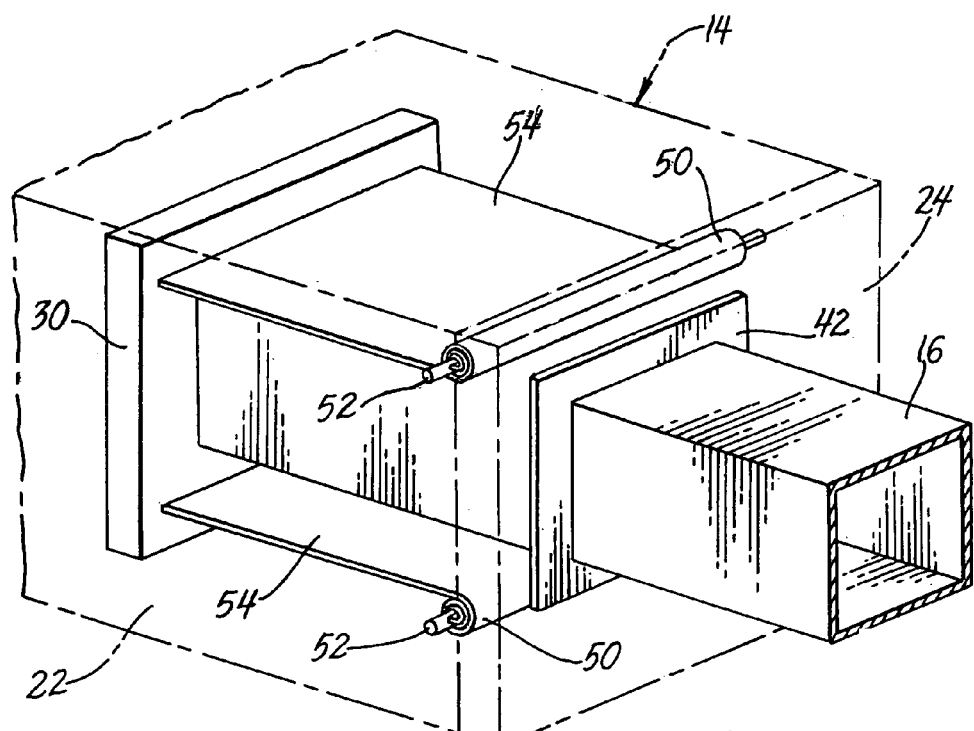
FIG. 3 is an isometric view of a portion of a crash box using rolled sheets of NiTi shape memory alloy.

FIG. 3 of the drawings is a fragmentary view of a crash box, in phantom outline, in which the nickel titanium material is initially in the form of a sheet material in helical roll form like a window shade. In this embodiment, two partially rolled up sheets of nickel-titanium shape memory material are seen within box 14. Sheet material rolls 50 are carried on roll pins 52 fixed to vertical sides 22 near front end 24 of crash box 14. Rolls 50 are supported above the top side and below the bottom side of ram 16. The rolls 50 are generally parallel to ram 16. The SMA material is initially partially rolled up. As NiTi in its Austenite phase has a Young's modulus slightly greater than aluminum, depending upon the thickness of the rolled sheet, it can absorb considerable energy to unwind each roll 50 into its flat sheet form (sheet portion indicated at 54). So the unwinding of the sheet progressively involves elastic strain and then strain in the form of permanent deformation. Impact energy is absorbed during the unwinding of the roll and any subsequent strain of the unwound sheet. As in the spring embodiment, limited unwinding of the rolled sheet may be repaired. The unrolled sheets may be heated by passing an electrical current through to rewind them on roll pins 52. The connection for electrical resistance heating to the rolled sheets may be made through conductive strip 42 and the rear end of the unwound portion of roll 50 is connected to the rear wall 30 of crash box 14 and electrically grounded to the vehicle body through that wall 30. The rolled or unrolled sheet portions are healed and tuned by suitable electric resistance heating as described with respect to springs 32. Rolls 50 can be healed and tuned independently of each other.

In place of (or in addition to) springs and rolls, tubes of the nickel titanium sheet memory alloy material may be adapted for use as the energy absorbing material in a crash box. Tubes of suitable wall thickness and spacing can be used in many configurations to absorb impact energy and then heated to return them to their original shape. For example, the impact can be taken on the end of the tube or tube cluster and energy absorbed during the controlled crumpling or rolling over of the end of the tube. Tubes may be employed as an array of several parallel spaced-individual tubes each absorbing its share of the impact. Wall thicknesses may be varied to obtain a specified total energy absorption while retaining the healable strain in the tubes for low speed impacts. Tubes of different diameters may be employed in a concentric array so that a series of progressively smaller diameter tubes are employed within an outer tube. Furthermore the inner tubes can have greater length than outer tubes so that the smaller tubes are progressively crushed into larger tubes and the impact absorbing effect progresses from small diameter tubes to progressively larger tubes.

Of, course, other forms of energy absorbing bodies can be devised such as SMA formed into wire meshes, or porous bodies such as SMA foam.

Reparable and tunable shape memory absorption devices can be used with computer based, on-board vehicle crash impact systems. These systems are already in use on vehicles for control of inflation of air bags. Some systems use radar with a computer to determine the rate of closure of the vehicle with an object. Rate of closure information and information on the size of an approaching article can be used by a computer to determine whether to tune a shape memory material device to a higher energy absorption capacity. While radar systems are not presently common on vehicles, accelerometers are used with computer-based controllers for air bag inflation. Whatever the crash input device the data can also be used in tuning and operation of the impact absorbing device of this invention. In a simple system the vehicle velocity at the time of the impact can be used in tuning the sheet memory material.

The computer-executed process is performed when the vehicle is in operation. The energy absorbing material is suitably tuned to it lowest setting until an impact is detected. If a crash situation is detected and a level of impact assessed on a timely basis, a decision is made whether to increase the capacity of the shape memory material by commanding the passage of an electrical heating current through it to transform it to its austenite form. If the actual impact requires such tuning it is unlikely that a repair step will be helpful. If such an increase is not required, the impact is still assessed to determine whether the device requires healing. If healing is possible and indicated it is accomplished by heating the shape memory material to its austenite form to restore its shape for a subsequent impact.

Thus, this invention uses shape memory materials in the management of impact energy absorption devices. Where the material selected can be both healed and tuned as described, these features are preferably utilized to the fullest extent by consideration of vehicle speed and/or by computer controlled impact detection and assessment. Where the shape memory material used is not tunable the device is still used in a manner that facilitates repair of the material at suitably low impact levels.

Reference to shape memory alloys has been made in describing the use of the invention with on the road passenger vehicle capable of high speed. The invention can also be used in slower, usually smaller vehicles such as golf cart type vehicles used in some communities in limited areas. In such applications shape memory polymers may be particularly suitable for use in tunable and healable energy absorbing shapes. SMPs are typically mixtures of two or more types of polymers with different glass transition temperatures, Tg. Each polymer in the mixture is stiffer when it is below it transition temperature and softer, more rubbery, when heated above its transition temperature. The polymer mixture is formulated to contain suitable proportions of component with appropriate respective Tg values. The shape of the SMP energy absorbing element is trained or set at a suitable temperature level. The SMP element is tuned by heating or cooling to an appropriate temperature depending on the Tg values of the polymer constituents. And the SMP element is typically healed by heating it above one or more of the constituent Tg values.

The invention has been described in terms of several illustrative embodiments. However, other forms could readily be adapted by those skilled in the art. The scope of the invention is not intended to be limited to the illustrated embodiments.

The invention claimed is:

1. A device for absorption of impact energy when fixed in use to a vehicle body component, said device comprising one or more deformable members of shape memory material aligned for deformation by an impact on said device, each of said one or more deformable members having a first strength level at an operating temperature of the device and a second strength level at a higher temperature, and each of said one or more deformable members being selectively heatable, before said impact or at the onset of said impact, from said operating temperature to said higher temperature to tune the energy absorption capacity of the device without changing the shape of said one or more deformable members.

2. The device recited in claim 1 in which said one or more deformable members are aligned between a vehicle bumper and a vehicle body rail.

3. The device recited in claim 1 comprising:
   a crash box having an inlet end;
   a ram having a first end partially inserted into the inlet end of the box and a second end, the ram being aligned when fixed in use to receive an impact on said vehicle body at the second end and to be driven by said impact further into said crash box; and
   each of said one or more deformable members, having two ends with one end being fixed to said box and the other end fixed to said ram for absorption of impact energy by stretching of said one or more deformable members.

4. The device recited in claim 1 in which at least one of said one or more deformable members is a shape memory metal alloy.

5. The device recited in claim 1 in which at least one of said one or more deformable members is a shape memory metal alloy comprising titanium and nickel, and said at least one deformable member has a relatively low strength martensite phase at said operating temperature and a higher strength austenite phase at said higher temperature.

6. The device as recited in claim 3 in which at least one of said one or more deformable members comprises a spring.

7. A device for absorption of impact energy when fixed in use to a vehicle body component, said device comprising one or more deformable members of a shape memory material aligned for deformation by an impact on said device, said one or more deformable members being deformable from an initial shape and thereafter restorable to their initial shape upon being heated to a predetermined temperature;
   said one or more deformable members having a first strength level at an operating temperature of said device and a second strength level at a temperature above the operating temperature; and
   an electrical connection to each of said one or more deformable members for selectively and individually heating said one or more deformable members, before said impact or at the onset of said impact, by electric resistance heating to tune the energy absorption capacity of the device without changing the shape of said one or more deformable members.

8. The device for absorption of impact energy as recited in claim 7 in which said one or more deformable members are of a shape memory metal alloy having a first strength level at an operating temperature of said device and a second and greater strength level at a temperature above the operating temperature; such that individual deformable members of said one or more deformable members can be selectively heated to increase the energy absorption capacity of the device.

9. The device for absorption of impact energy as recited in claim 8 in which said one or more deformable members comprise titanium and nickel.

10. A device for absorption of impact energy when fixed in use to a vehicle body component, said device comprising:
a crash box having an inlet end;
a ram having a first end partially inserted into the inlet end of the crash box and a second end, the ram being aligned when fixed in use to receive an impact on said vehicle body at the second end and to be driven by said impact further into said crash box;
one or more deformable members of shape memory material, said one or more deformable members being deformable from an initial shape and thereafter restorable to their initial shape upon being heated to a predetermined temperature, said one or more deformable member(s) having two ends with one end being fixed to said box and the other end fixed to said ram for absorption of impact energy;
said one or more deformable members having a first strength level at an operating temperature of said device and a second strength level at a temperature above the operating temperature; and
an electrical connection to each of said one or more deformable members for selectively and individually heating said one or more deformable members by electrical resistance heating to tune the energy absorption capacity of the device.

11. The device recited in claim 10 in which at least one of said one or more deformable members is a shape memory metal alloy having a first strength level at an operating temperature of said device and a second and greater strength level at a temperature above the operating temperature; such that said at least one deformable member can be selectively heated to increase the energy absorption capacity of the device.

12. The device recited in claim 10 in which at least one of said one or more deformable members is a shape memory metal alloy comprising titanium and nickel.

13. The device recited in claim 1 in which at least one of said one or more deformable members is a shape memory polymer or a combination of a shape memory alloy and shape memory polymer.

14. The device recited in claim 10 in which at least one of said one or more deformable members is a shape memory polymer or a combination of a shape memory alloy and shape memory polymer.

15. The device recited in claim 1 in which at least one of said one or more deformable members is a shape memory polymer having a relatively high strength at said operating temperature and a lower strength at said higher temperature.

16. The device recited in claim 10 in which at least one of said one or more deformable members is a shape memory polymer having a relatively high strength at said operating temperature and a lower strength at said higher temperature.

* * * * *